United States Patent
Saito et al.

(10) Patent No.: US 8,532,884 B2
(45) Date of Patent: Sep. 10, 2013

(54) ENGINE-DRIVEN MACHINE, CONTROL DEVICE FOR ENGINE-DRIVEN MACHINE, AND METHOD FOR CONTROLLING MAXIMUM OUTPUT CHARACTERISTIC OF ENGINE

(75) Inventors: Yoshiaki Saito, Kawaguchi (JP); Satoshi Matsumoto, Tochigi (JP)

(73) Assignee: Komatsu Ltd., Tokyo (JP)

( * ) Notice: Subject to any disclaimer, the term of this patent is extended or adjusted under 35 U.S.C. 154(b) by 449 days.

(21) Appl. No.: 12/736,161

(22) PCT Filed: Mar. 11, 2009

(86) PCT No.: PCT/JP2009/001089
§ 371 (c)(1),
(2), (4) Date: Sep. 16, 2010

(87) PCT Pub. No.: WO2009/116250
PCT Pub. Date: Sep. 24, 2009

(65) Prior Publication Data
US 2011/0010058 A1    Jan. 13, 2011

(30) Foreign Application Priority Data
Mar. 21, 2008   (JP) ................................ 2008-072976

(51) Int. Cl.
*G06F 7/70* (2006.01)
(52) U.S. Cl.
USPC ........................................................ 701/50

(58) Field of Classification Search
USPC ......... 37/348, 466, 468; 172/2–11; 180/197; 701/50, 84, 89, 90, 85–87
See application file for complete search history.

(56) References Cited

U.S. PATENT DOCUMENTS

| | | | | |
|---|---|---|---|---|
| 4,762,196 | A * | 8/1988 | Harada et al. | 180/197 |
| 5,211,680 | A * | 5/1993 | Sumimoto et al. | 477/109 |
| 6,330,927 | B1 * | 12/2001 | Tokuda | 180/197 |
| 6,616,559 | B1 * | 9/2003 | Hori et al. | 475/23 |

FOREIGN PATENT DOCUMENTS

| | | |
|---|---|---|
| JP | 61-14447 A | 1/1986 |
| JP | 10-159600 A | 6/1998 |

OTHER PUBLICATIONS

International Search Report mailed on Apr. 21, 2009 for the corresponding International patent application No. PCT/JP2009/001089 (English translation enclosed).

* cited by examiner

*Primary Examiner* — Robert Pezzuto
(74) *Attorney, Agent, or Firm* — Posz Law Group, PLC

(57) ABSTRACT

An engine-driven machine having plural kinds of load devices driven by an engine is provided with a load torque calculation unit that calculates a present load torque applied to the engine from a load device of at least one kind, and a control unit that performs variable control of a maximum output characteristic of the engine in accordance with the calculated load torque, such that a maximum output torque that can be outputted by the engine at the present engine revolution speed becomes a maximum output torque that is equal to or greater than the calculated load torque.

20 Claims, 11 Drawing Sheets

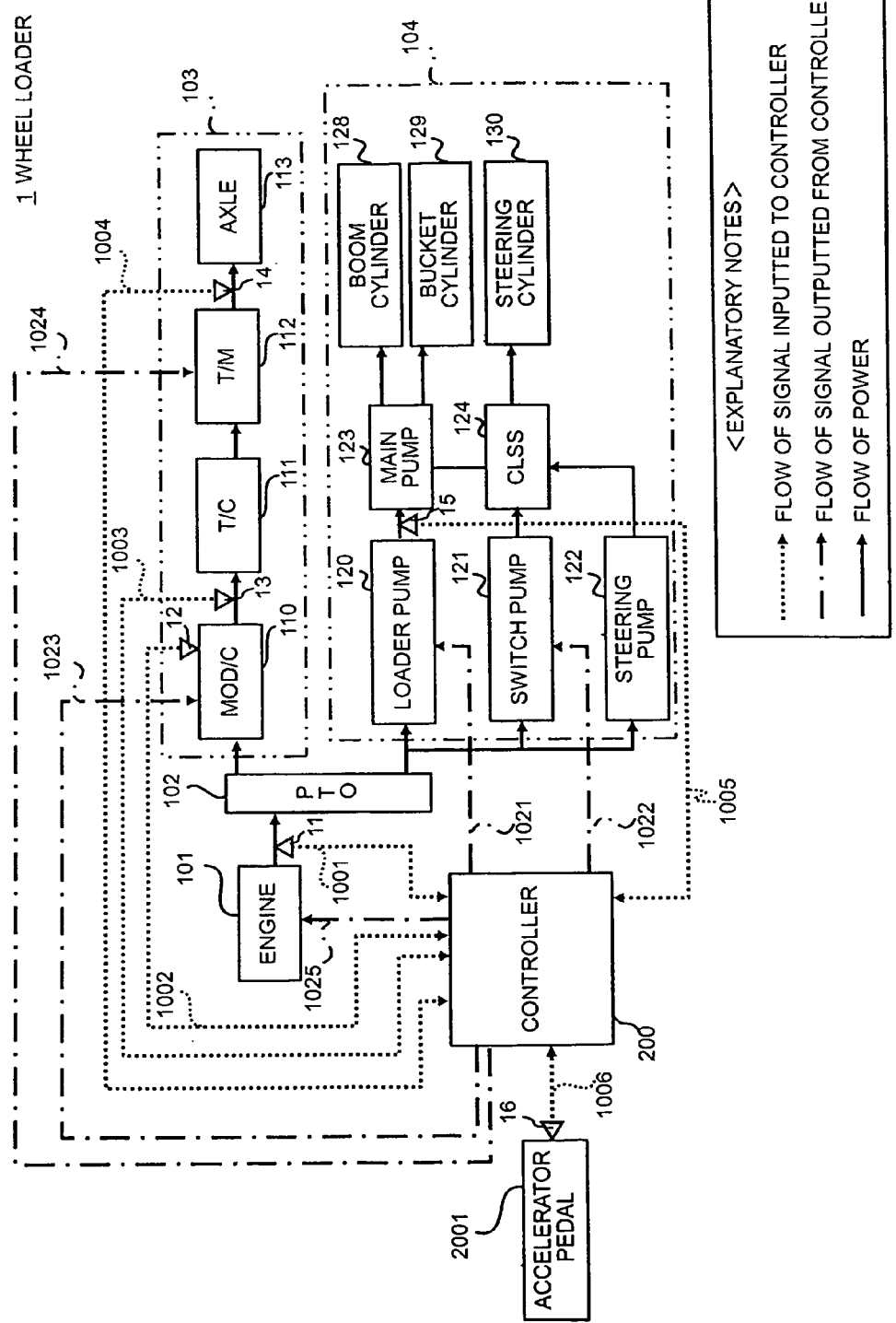

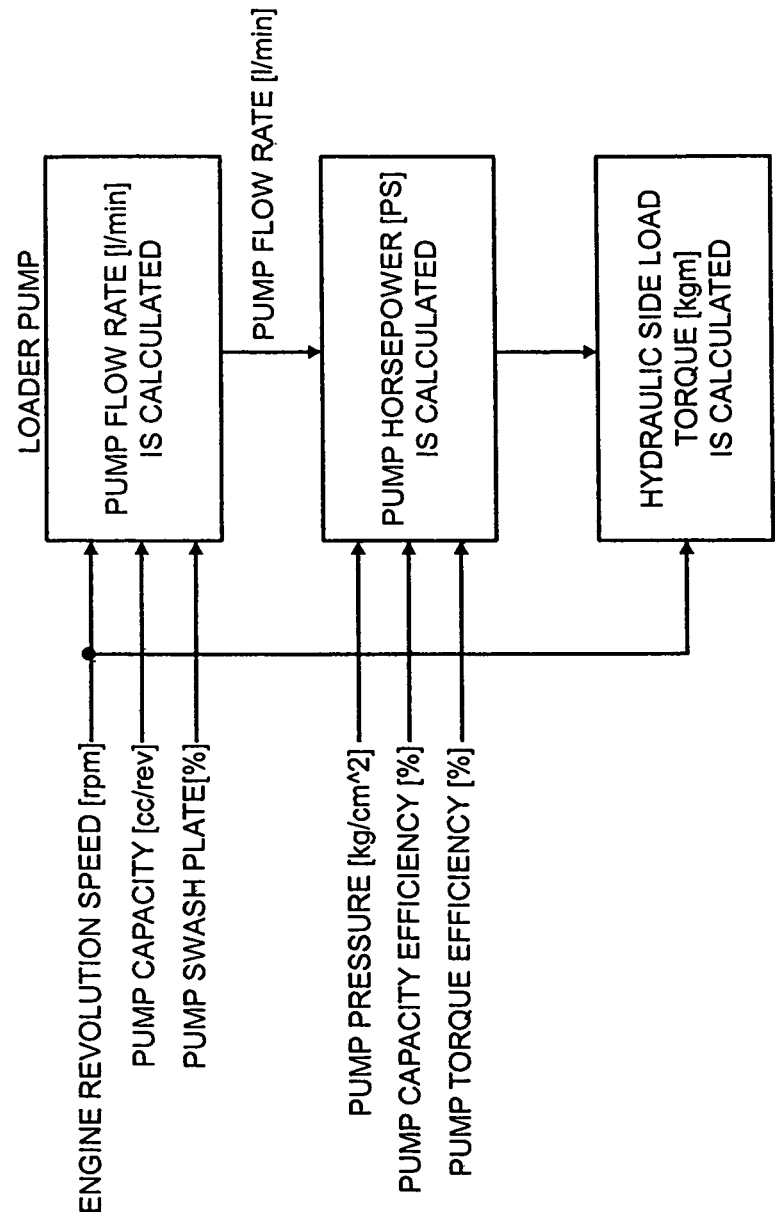

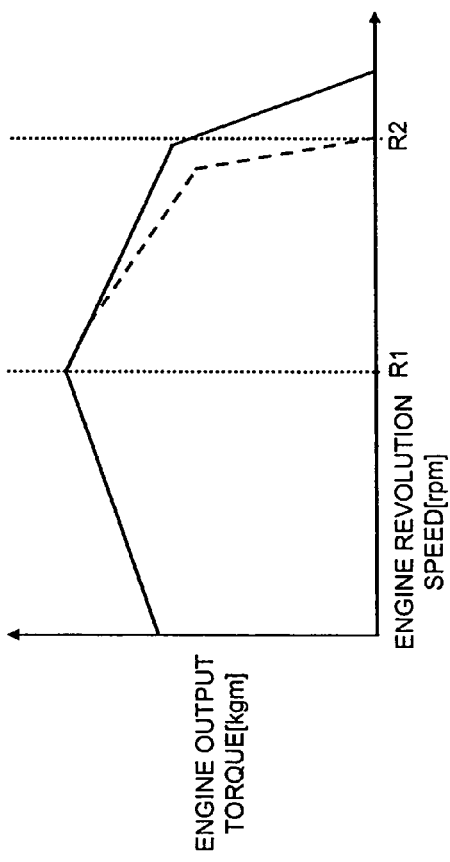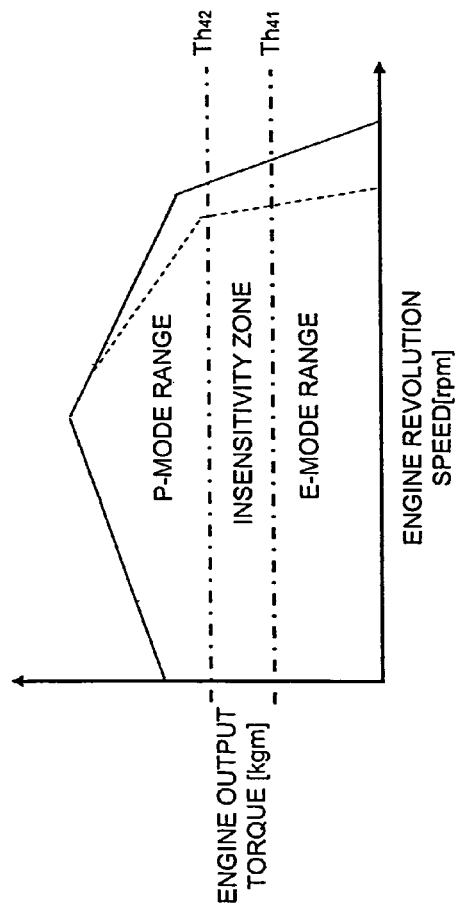

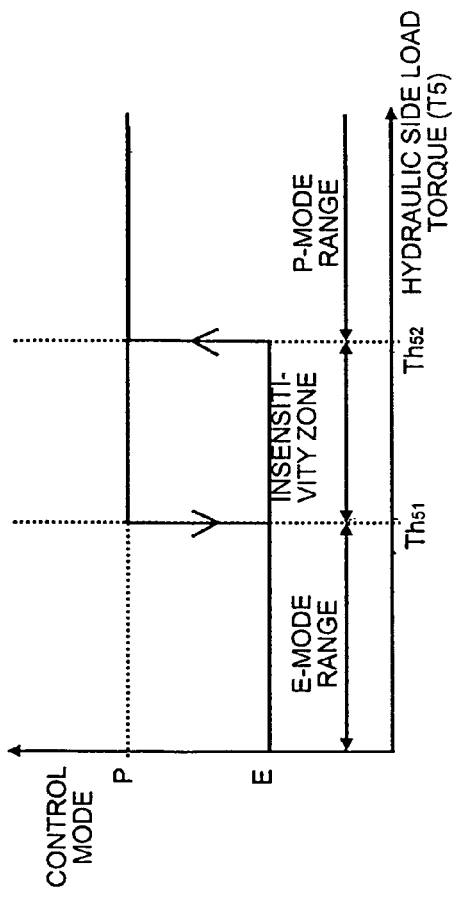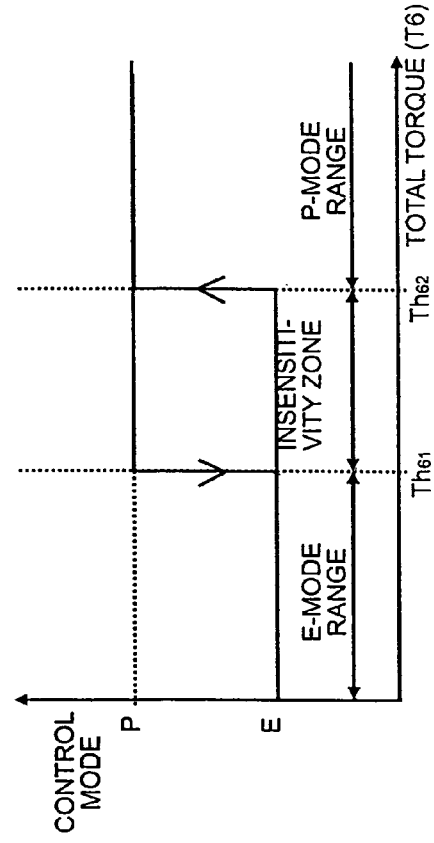

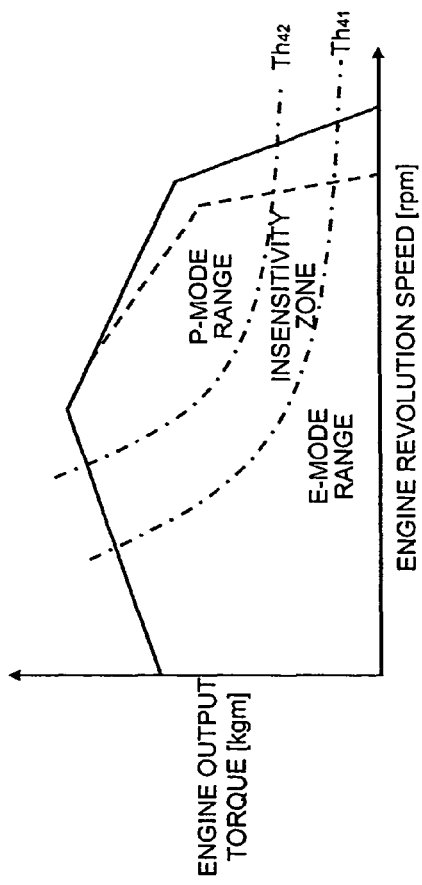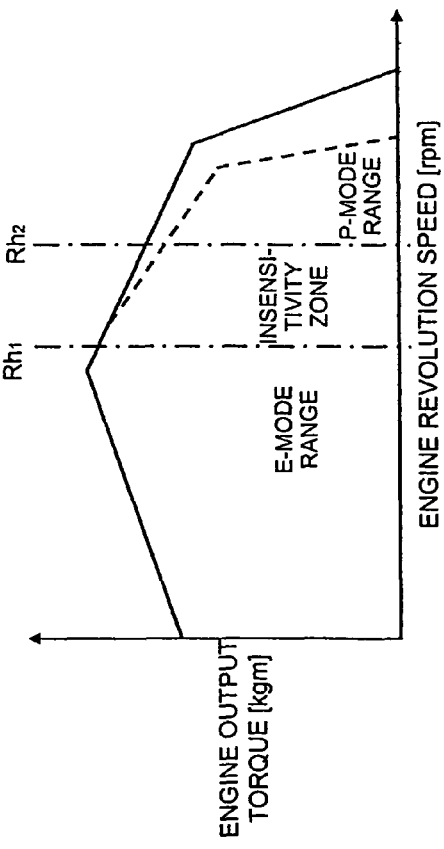

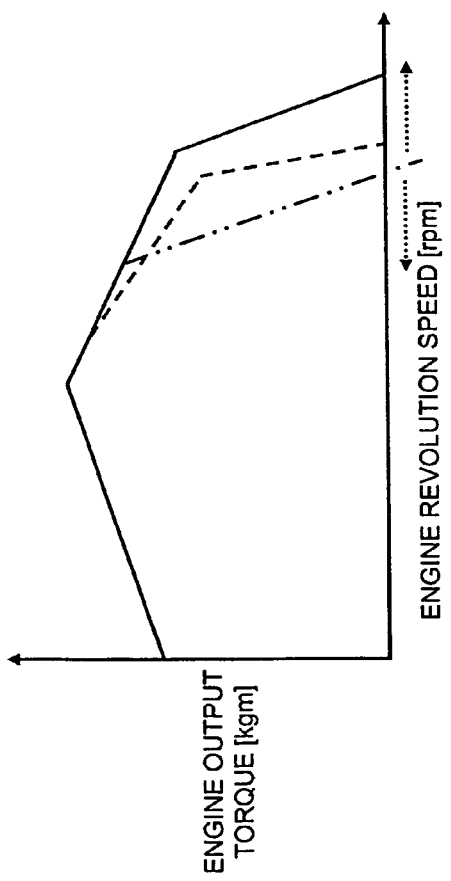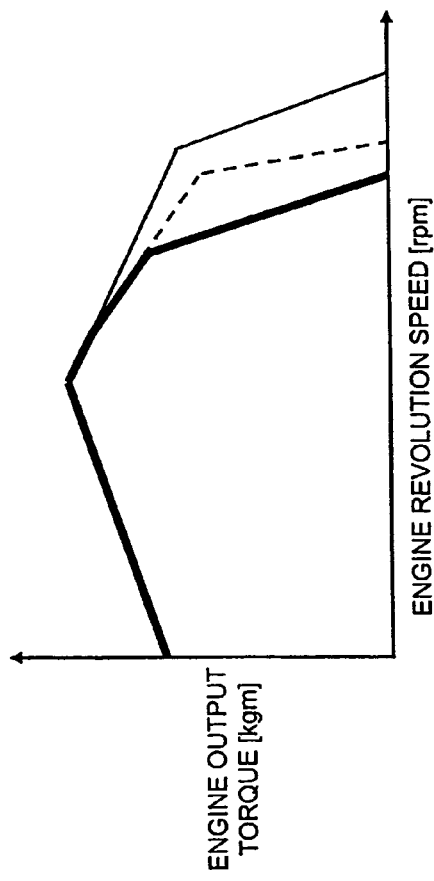

ENGINE-DRIVEN MACHINE, CONTROL DEVICE FOR ENGINE-DRIVEN MACHINE, AND METHOD FOR CONTROLLING MAXIMUM OUTPUT CHARACTERISTIC OF ENGINE

CROSS REFERENCE TO RELATED APPLICATIONS

This application is a U.S. national stage application of PCT/JP2009/001089 filed on Mar. 11, 2009, and claims priority to, and incorporates by reference, Japanese Patent Application No. 2008-072976 filed on Mar. 21, 2008.

TECHNICAL FIELD

The present invention relates to control of a maximum output characteristic of an engine.

BACKGROUND ART

Examples of machines having a plurality of load devices that are driven by an engine include working vehicles such as power shovels and wheel loaders. A working vehicle is usually provided with a traveling implement and a work implement.

For example, a technique disclosed in Patent Citation 1 is known as a technique relating to output control of an engine of a working vehicle. With this technique, the consumed horsepower of the traveling implement and work implement is measured at various points in time, and when the operator requests the speed of the work implement, an engine revolution speed is selected such that the work implement is operated at this speed. Where the operator does not request the speed of the work implement, the engine revolution speed is selected such that ensures the best fuel consumption efficiency at the consumed horsepower of the traveling implement and work implement.

PATENT CITATION 1

Japanese Patent Application Laid-Open No. 61-14447

DISCLOSURE OF INVENTION

Technical Problem

With the technique described in Patent Citation 1, it is determined whether to select the engine revolution speed with the best fuel consumption efficiency in relation to the measured consumed horsepower or to select the engine revolution speed at which the work implement will be operated at the speed desired by the operator. Therefore, even when there are no fluctuations in the consumed horsepower, the engine revolution speed can fluctuate against the operator's intention.

When the work implement is operated in a state in which the working vehicle is stopped, these fluctuations of the revolution speed of the engine that occur against the operator's intention cause no substantial problem. This is because they can be considered as a change in the speed of the work implement.

However, when the working vehicle travels and performs a work in parallel, the problem caused by the fluctuations of engine revolution speed that occur against the operator's intention pose a more serious problem than in the case in which the working vehicle works after being stopped. This is because if the engine revolution speed fluctuates against the operator's intention when it is desired that the working vehicle continue to travel at the speed selected by the operator, the speed of the working vehicle will fluctuate against the operator's intention.

Accordingly it is an object of the present invention to ensure the output of a desirable power, without causing the fluctuations of engine revolution speed against the operator's intention. More specifically, it is an object to ensure the output of power corresponding to a work, without causing variations in the travel speed against the operator's intention, when the working vehicle travels and performs a work at the same time.

Other objects of the present invention will become apparent from the following description.

Technical Solution

Reference numerals in parentheses in the following description represent by way of example a correspondence relationship with the elements described in the appended drawings, but these reference numerals are merely illustrative and place no limitation on the technical scope of the present invention.

An engine-driven machine according to the first aspect of the present invention includes a load torque calculation unit (1201) that calculates a present load torque applied to an engine (101) from a load device of at least one kind; and a control unit (1203) that performs variable control of a maximum output characteristic of the engine (101) in accordance with the calculated load torque, such that a maximum output torque that can be outputted by the engine (101) at the present engine revolution speed becomes a maximum output torque that is equal to or greater than the calculated load torque.

As a result, the desired power is outputted without causing engine revolution speed fluctuations against the operator's intention.

According to the second aspect, in the engine-driven machine according to the first aspect, the control unit (1203) is configured to have a first mode and a second mode, perform control in the first mode so as to match the maximum output characteristic of the engine (101) with a first maximum output characteristic, and perform control in the second mode so as to match the maximum output characteristic of the engine (101) with a second maximum output characteristic. When the calculated load torque conforms to a first load torque condition, the control unit (1203) matches the maximum output characteristic of the engine (101) with the first maximum output characteristic, and when the calculated load torque conforms to a second load torque condition, the control unit matches the maximum output characteristic of the engine (101) with the second maximum output characteristic. The maximum output torque in a predetermined engine revolution speed range in the first maximum output characteristic is lower than that of the second maximum output characteristic.

According to the third aspect, in the engine-driven machine according to the second aspect, the first load torque condition is a condition of the calculated load torque being equal to or less than a first load torque threshold. The second load torque condition is a condition of the calculated load torque being equal to or greater than a second load torque threshold. The first load torque threshold is lower than the second load torque threshold.

According to the fourth aspect, in the engine-driven machine according to the third aspect, the first load torque threshold and/or the second load torque threshold is constant regardless of an engine revolution speed and/or accelerator opening degree.

According to the fifth aspect, in the engine-driven machine according to the third aspect, the first load torque threshold and/or the second load torque threshold is a function of an engine revolution speed and/or accelerator opening degree.

According to the sixth aspect, in the engine-driven machine according to any of the second to fifth aspects, the engine-driven machine is a working vehicle (1) provided with a traveling system (103) and a hydraulic device system (104). The calculated load torque is of at least one kind from among a load torque of a first kind applied by a load device that belongs to the traveling system (103), a load torque of a second kind applied by a load device (one or a plurality of hydraulic pumps, for example) that belongs to the hydraulic device system (104), and a load torque of a third kind calculated on the basis of the load torque of a first kind and the load torque of a second kind.

According to the seventh aspect, in the engine-driven machine according to the sixth aspect, the first load torque condition and the second load torque condition are respectively set for each kind of load torque.

According to the eighth aspect, in the engine-driven machine according to the sixth or seventh aspect, the calculated load torque is constituted by load torques of at least two kinds from among the load torques of first to third kinds. When load torques of a predetermined number of kinds that is less than half of the at least two kinds conform to the second load torque condition, respectively, the control unit (1203) matches the maximum output characteristic of the engine (101) with the second maximum output characteristic.

According to the ninth aspect, in the engine-driven machine according to the sixth or seventh aspect, the calculated load torque is constituted by load torques of at least two kinds from among the load torques of first to third kinds. When load torques of a predetermined number of kinds that is less than half of the at least two kinds conform to the first load torque condition, respectively, the control unit (1203) matches the maximum output characteristic of the engine (101) with the first maximum output characteristic.

According to the tenth aspect, in the engine-driven machine according to any one of the second to ninth aspects, the control unit (1203) matches the maximum output characteristic of the engine (101) with the first maximum output characteristic when a present engine revolution speed conforms to a first revolution speed condition even if the calculated load torque does not conform to the first load torque condition, and/or matches the maximum output characteristic of the engine (101) with the second maximum output characteristic when the present engine revolution speed conforms to a second revolution speed condition even if the calculated load torque does not conform to the second load torque condition.

According to the eleventh aspect, in the engine-driven machine according to the tenth aspect, the first revolution speed condition is a condition of the present revolution speed being equal to or lower than a first revolution speed threshold. The second revolution speed condition is a condition of the present revolution speed being equal to or greater than a second revolution speed threshold. The first revolution speed threshold is lower than the second revolution speed threshold.

According to the twelfth aspect, in the engine-driven machine according to the eleventh aspect, the first revolution speed threshold and/or the second revolution speed threshold is constant regardless of the load torque applied to the engine (101) and/or accelerator opening degree.

According to the thirteenth aspect, in the engine-driven machine according to the eleventh aspect, the first revolution speed threshold and/or the second revolution speed threshold is a function of the load torque applied to the engine (101) and/or accelerator opening degree.

According to the fourteenth aspect, in the engine-driven machine according to the first aspect, a surplus torque calculation unit (1205) is further provided. The surplus torque calculation unit (1205) calculates a surplus torque that is a difference between the calculated load torque and a maximum output torque at the present engine revolution speed. The control unit (1203) performs variable control of the maximum output characteristic of the engine (101) in accordance with the calculated surplus torque.

According to the fifteenth aspect, in the engine-driven machine according to the fourteenth aspect, the control unit (1203) is configured to have a first mode and a second mode, perform control in the first mode so as to match the maximum output characteristic of the engine (101) with a first maximum output characteristic, and perform control in the second mode so as to match the maximum output characteristic of the engine (101) with a second maximum output characteristic. When the calculated surplus torque conforms to a first surplus torque condition, the control unit (1203) matches the maximum output characteristic of the engine (101) with the first maximum output characteristic, and when the calculated surplus torque conforms to a second surplus torque condition, the control unit matches the maximum output characteristic of the engine (101) with the second maximum output characteristic. The maximum output torque in a predetermined engine revolution speed range in the first maximum output characteristic is lower than that in the second maximum output characteristic.

According to the sixteenth aspect, in the engine-driven machine according to the fifteenth aspect, the first surplus torque condition is a condition of the calculated load torque being equal to or greater than a first surplus torque threshold. The second surplus torque condition is a condition of the calculated surplus torque being equal to or less than a second surplus torque threshold. The first surplus torque threshold is higher than the second surplus torque threshold. The first surplus torque threshold and/or the second surplus torque threshold may be constant regardless of the engine revolution speed and/or accelerator opening degree, or may be a function of the engine revolution speed and/or accelerator opening degree.

According to the seventeenth aspect, in the engine-driven machine according to any one of the fourteenth to sixteenth aspects, the surplus torque is a difference between a maximum output torque at a present engine revolution speed and a present accelerator opening degree, and the calculated load torque.

According to the eighteenth aspect, in the engine-driven machine according to any one of the first to seventeenth aspects, the control unit (1203) performs variable control of the maximum output characteristic of the engine (101) such that a maximum distributed torque that is outputted from the engine (101) at a present engine revolution speed and can be distributed to the load device of at least one kind is equal to or greater than the calculated load torque.

According to the nineteenth aspect, in the engine-driven machine according to any one of the first to eighteenth aspects, the meaning of being equal to or greater than the calculated load torque is being equal to or greater than a sum total of the calculated load torque and a torque of a predetermined size.

A control device according to the twentieth aspect of the present invention is a control device for an engine-driven machine having plural kinds of load devices driven by the engine (101), the control device including the load torque calculation unit (1201) and the control unit (1203).

A method according to the twenty first aspect of the present invention is a method for controlling a maximum output characteristic of the engine (101), the method including a step of calculating a present load torque applied to the engine (101) from at least one kind of load device among the plural kinds of load devices driven by the engine (101), and a step of performing variable control of a maximum output characteristic of the engine (101) in accordance with the calculated load torque, so that a maximum output torque that can be outputted by the engine (101) at the present engine revolution speed becomes a maximum output torque that is equal to or greater than the calculated load torque.

An engine-driven machine according to the twenty second aspect of the present invention includes a revolution speed detection unit (11) that detects a present engine revolution speed and a control unit (1203) that performs variable control of a maximum output characteristic of the engine (101) in accordance with the detected engine revolution speed.

According to the twenty third aspect, in the engine-driven machine according to the twenty second aspect, the control unit (1203) is configured to have a first mode and a second mode, perform control in the first mode so as to match the maximum output characteristic of the engine (101) with a first maximum output characteristic, and perform control in the second mode so as to match the maximum output characteristic of the engine (101) with a second maximum output characteristic. When the detected engine revolution speed conforms to a first revolution speed condition, the control unit (1203) matches the maximum output characteristic of the engine (101) with the first maximum output characteristic, and when the detected engine revolution speed conforms to a second revolution speed condition, the control unit matches the maximum output characteristic of the engine (101) with the second maximum output characteristic. The maximum output torque in a predetermined engine revolution speed range in the first maximum output characteristic is lower than that of the second maximum output characteristic.

According to the twenty fourth aspect, in the engine-driven machine according to the twenty third aspect, the first revolution speed condition is a condition of the detected engine revolution speed being equal to or less than a first revolution speed threshold. The second revolution speed condition is a condition of the detected engine revolution speed being equal to or greater than a second revolution speed threshold. The first revolution speed threshold is lower than the second revolution speed threshold.

According to the twenty fifth aspect, in the engine-driven machine according to the twenty fourth aspect, the first revolution speed threshold and/or the revolution speed threshold is constant regardless of a load torque applied to the engine (101) and/or accelerator opening degree.

According to the twenty sixth aspect, in the engine-driven machine according to the twenty fourth aspect, the first revolution speed threshold and/or the second revolution speed threshold is a function of a load torque applied to the engine (101) and/or accelerator opening degree.

According to the twenty seventh aspect, in the engine-driven machine according to any of the twenty third to twenty sixth aspects, the control unit (1203) matches the maximum output characteristic of the engine (101) with the first maximum output characteristic when the load torque applied to the engine (101) from at least one kind of load device among the plural kinds of load devices driven by the engine (101) conforms to a first load torque condition, even if the detected engine revolution speed does not conform to the first revolution speed condition, and matches the maximum output characteristic of the engine (101) with the second maximum output characteristic when the load torque conforms to a second load torque condition, even if the detected engine revolution speed does not conform to the second revolution speed condition.

According to the twenty eighth aspect, in the engine-driven machine according to the twenty seventh aspect, the first load torque condition is a condition of the load torque being equal to or lower than a first load torque threshold. The second load torque condition is a condition of the load torque being equal to or greater than a second load torque threshold. The first revolution speed threshold is lower than the second revolution speed threshold.

According to the twenty ninth aspect, in the engine-driven machine according to the twenty eighth aspect, the first load torque threshold and/or the second load torque threshold is constant regardless of the present engine revolution speed and/or accelerator opening degree.

According to the thirtieth aspect, in the engine-driven machine according to the twenty eighth aspect, the first load torque threshold and/or the second load torque threshold is a function of the present engine revolution speed and/or accelerator opening degree.

A control device according to the thirty first aspect of the present invention includes the revolution speed detection unit (11) and the control unit (1203) that performs variable control of a maximum output characteristic of the engine (101) in accordance with the detected engine revolution speed.

A method according to the thirty second aspect of the present invention is a method for controlling a maximum output characteristic of the engine (101), the method including a step of detecting a present engine revolution speed and a step of performing variable control of a maximum output characteristic of the engine (101) in accordance with the detected engine revolution speed.

The above-described engine-driven machine is for example a vehicle. The vehicle may be a passenger vehicle equipped with a traveling system and having no hydraulic device system, or may be a working vehicle equipped with both the hydraulic device system and the traveling system.

The above-described units may be means and can be constituted by hardware, a computer program, or combination thereof (for example, some are realized by a computer problem, and the remaining are realized by hardware). The computer program is written in a predetermined processor and executed thereby. During information processing conducted by reading a computer program in the processor, a storage region present on hardware resources such as memory can be appropriately used. The computer program may be installed to the computer from a recording medium such as CD-ROM, or may be downloaded to the computer via a communication network.

BRIEF DESCRIPTION OF DRAWINGS

FIG. 1 shows the entire configuration of a wheel loader employing the working vehicle according to the first embodiment of the present invention.

FIG. 3 shows a calculation procedure of a hydraulic side load torque (loader pump load torque) in the first embodiment.

FIG. 4A is a diagram representing a P-mode maximum output characteristic and an E-mode maximum output characteristic, and FIG. 4B illustrates the relationship between a traveling side load torque and a control mode range.

FIG. 5A shows the relationship between a control mode range and a hydraulic side load torque calculated in the case of a certain engine revolution speed, and FIG. 5B shows the relationship between a control mode range and a total torque (sum total of a traveling side load torque and a hydraulic side load torque) calculated in the case of a certain engine revolution speed.

FIG. 7A is an explanatory drawing of a traveling side load torque threshold in the second variation example of the first embodiment of the present invention, and FIG. 7B shows the relationship between an engine revolution speed and a control mode range in the second embodiment of the present invention.

FIG. 10A shows an example of output limit that follows an accelerator opening degree, and FIG. 10B shows a present maximum output characteristic determined on the basis of the output limit that follows an accelerator opening degree and an E-mode output maximum characteristic.

EXPLANATION OF REFERENCES

Reference Signs List

Figure 2A:
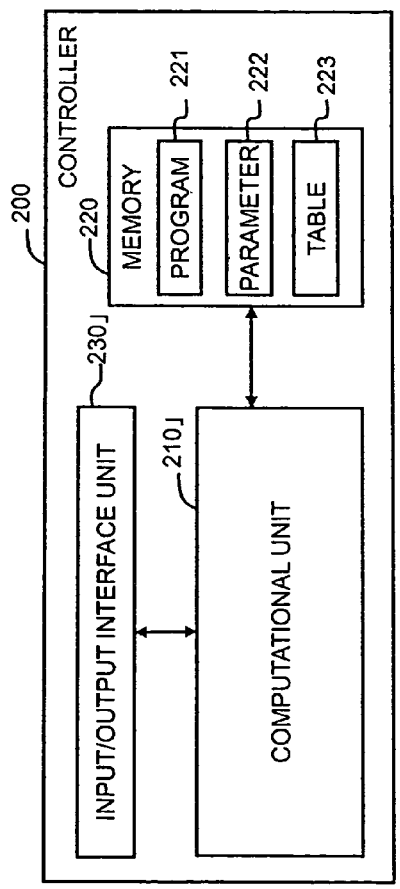
FIG. 2A shows schematically the controller functions.

1: wheel loader, 101: engine, 102: output distributor, 103: traveling system, 104: hydraulic device system, 110: clutch, 111: torque converter, 112: transmission, 113: axle, 120: loader pump, 121: switch pump, 122: steering pump, 123: main valve, 124: load sensing valve, 128: boom cylinder, 129: bucket cylinder, 130: steering cylinder, 200: controller

BEST MODE FOR CARRYING OUT FOR THE INVENTION

Several embodiments of the present invention will be described below with reference to the appended drawings.

Embodiment 1

The first embodiment of the present invention will be described below with reference to an application to a wheel loader as a working vehicle. However, the present embodiment can be also applied to other working vehicles that differ from the wheel loader.

FIG. 1 is an explanatory drawing illustrating schematically the entire configuration of the wheel loader.

The wheel loader 1 includes an engine 101, a power distributor (PTO: Power Take Off) 102 that distributes the output of the engine 101 to a traveling system 103 and a hydraulic device system 104, the traveling system 103 for causing the wheel loader 1 to travel, and the hydraulic device system 104 for driving mainly a working implement (for example, a boom or a bucket).

The traveling system 103 includes, for example, a modulation clutch (referred to hereinbelow as "clutch") 110, a torque converter 111, a transmission 112, and an axle 113. The engagement and disengagement of the clutch 110 is controlled, for example, hydraulically. More specifically, the clutch 110 is controlled by a hydraulic pressure designated by a clutch command pressure (control signal designating the hydraulic pressure to the clutch 110) from a controller 200. The pressure supplied to the clutch 13 will be called hereinbelow "clutch pressure". For the sake of convenience of explanation, the clutch, torque converter, and transmission are denoted in the figure by symbols "Mod/C", "T/C", and "T/M", respectively. The power outputted from the engine 101 is transmitted to the tires (not shown in the figure) via the clutch 110, torque converter 111, transmission 112, and axle 113.

The hydraulic device system 104 includes, for example, a loader pump 120, a switching pump 121, a steering pump 122, a main valve 123, a load sensing (steering) valve (in the figure, CLSS: Closed Center Load Sensing System) 124, a boom cylinder 128, a bucket cylinder 129, and a steering cylinder 130.

The loader pump 120 serves to supply operating-oil to the boom cylinder 128 and the bucket cylinder 129. The steering pump 122 serves to supply operating-oil to the steering cylinder 130. The switch pump 121 serves to supply operating-oil to either the steering cylinder 130 or to the boom cylinder 128 and the bucket cylinder 129. The pumps 120, 121 are configured, for example, as swash plate hydraulic pumps and the angles of the swash plates are controlled by control signals from the controller 200.

The load sensing valve 124 mechanically controls the supply destination and supply amount for the operating-oil discharged from the switch pump 121 correspondingly to a load. The load sensing valve 124 can be also called "steering valve". In the usual travel mode, the operating-oil discharged from the switch pump 121 is supplied to the steering cylinder 130 via the load sensing valve 124. Thus, in the travel mode, the switch pump 121 acts to assist the steering pump 122 and actuate the steering cylinder 130. In the present embodiment, a CLSS valve is used as an example of the load sensing valve (or steering valve) 124, but the present invention can be also applied to configurations using other valves that differ from the CLSS valve.

By contrast, in a working mode, the operating-oil discharged from the switch pump 121 is supplied to the boom cylinder 128 via the load sensing valve 124 and the main valve 123.

The main valve 123 supplies the operating-oil discharged from the loader pump 120 (or both the loader pump 120 and the switch pump 121) to the boom cylinder 128 or the bucket cylinder 129 in response to the pilot pressure inputted from the bucket lever or boom lever.

The hydraulic device system 104 may be provided with other pumps in addition to or instead of at least one of the above-described pumps 120, 121, and 122. For example, the wheel loader 1 may be provided with a pump for driving a cooling fan, a pump for lubricating the transmission 112, or a pump for generating a brake pressure.

The wheel loader 1 is provided with a variety of sensors, for example, an engine revolution speed sensor 11 that detects the engine revolution speed, a clutch pressure sensor 12 that detects the clutch pressure, a clutch output shaft revolution speed sensor 13 that detects the output shaft revolution speed of the clutch 110, a T/M output revolution speed sensor 14 that detects the output shaft revolution speed of the transmission 112, a loader pump hydraulic pressure sensor 15 that detects the hydraulic pressure of the loader pump, and an accelerator opening degree sensor 16 that detects the operation amount (referred to hereinbelow as "accelerator opening degree") of the accelerator pedal 2001. Various states detected by the sensors 11 to 16 are inputted as electric signals to the controller 200, as shown by dot-like arrows 1001 to 1006, respectively.

Further, the controller 200 (for example, the below-described control program 1203) sends a control signal designating a swash plate angle of the loader pump 120 to the loader pump 120, as shown by a dash-dot line arrow 1021, sends a control signal designating a swash plate angle of the switch pump 121 to the switch pump 121, as shown by a dash-dot arrow 1022, sends a clutch designated pressure to the clutch 110, as shown by a dot-dash line 1023, sends a control signal designating a shift ratio to the transmission 112, as shown by a dash-dot line 1024, and sends a fuel injection amount signal corresponding to the accelerator opening degree in the below-described maximum output characteristic to the engine 101, as shown by a dash-dot line 1025.

FIG. 2A shows a configuration example of the controller 200.

The controller 200 is constituted as an electronic circuit provided with, for example, a computational unit (for example, CPU (Central Processing Unit)) 210, a storage unit (for example, memory) 220, and an input/output interface unit 230.

The storage unit 220 stores, for example, a program 221 that is read and executed by the computational unit 210, and a parameter 222 and a table 223 used by the computational unit 210.

Figure 2B:
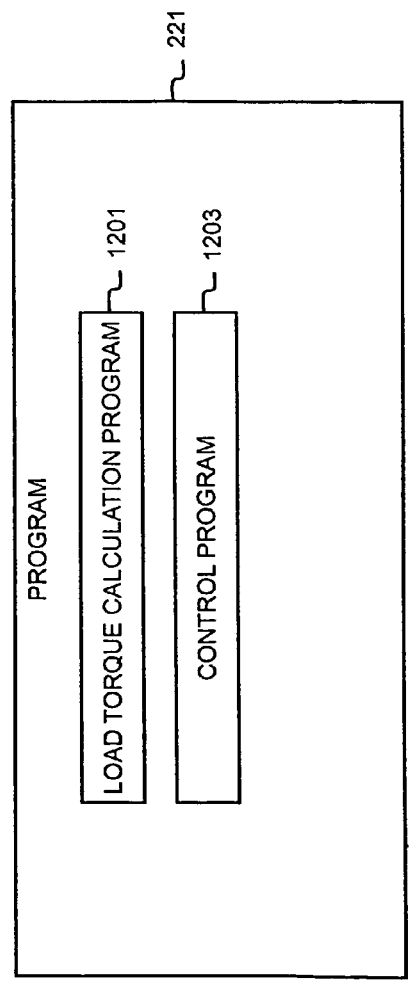
FIG. 2B shows a configuration example of the program 221.

As shown in FIG. 2B, the program 221 includes, for example, a load torque computation program 1201 and a control program 1203. The computational unit 210 executes the computation of the below-described load torque by reading the load torque computation program 1201 from the storage unit 220 and executing the program. Further, the computational unit 210 selects the maximum output characteristic and controls the maximum output characteristic of the engine 101 to match this characteristic with the selected maximum output characteristic by reading the control program 1203 from the storage unit 220 and executing the program. In the explanation below, when a computer program is a subject, it actually means that a processing is performed by the computational unit 210 executing this computer program.

The input/output interface unit 230 is a circuit for transmitting and receiving electric signals between various sensors 11 to 16, clutch 110, transmission 112, and pumps 120 to 122. The computational unit 210 receives signals from the sensors 11 to 16 via the input/output interface unit 230. Further, the computational unit 210 outputs a control signal to the clutch 110 or pumps 120 to 122 via the input/output interface unit 230.

The above-described configuration of the controller 200 is shown in a form simplified to a degree necessary to understand and implement the present invention, and the present invention is not limited to the above-described configuration.

In the present embodiment, the controller 200 periodically or aperiodically calculates a traveling side load torque, a hydraulic side load torque, and a sum total thereof (referred to hereinbelow as "total torque") and selects a maximum output characteristic at which the maximum output torque that can be outputted by the engine 101 at the detected engine revolution speed becomes a maximum output torque that is equal to or higher than the calculated engine load torque on the basis of the calculated traveling side load torque, hydraulic side load torque, and total torque. Each processing step performed by the controller 200 will be described below in greater detail.

<Calculation of Traveling Side Load Torque>

The "traveling side load torque" as referred to herein is a load torque applied to the engine 101 from a load device that belongs to the traveling system 103. The traveling side load torque is calculated by the load torque calculation program 1201. A traveling side load torque T4 (kgm) is calculated, for example, by computations conducted using the following Equation (1) to Equation (4).

$$T1 = (\text{Primary torque factor}) \times (T/C \text{ input revolution speed})^2 \times Q1 \quad (1)$$

$$T2 = (\text{Clutch pressure}) \times Q2 \quad (2)$$

$$T3 = \text{MIN}(T1, T2) \quad (3)$$

$$T4 = T3 / (\text{Gear ratio of traveling system in PTO}) \quad (4)$$

T1 is a torque inputted to a torque converter 111 (referred to hereinbelow as "T/C input torque"). The "primary torque factor" is an intrinsic factor relating to the performance of the torque converter 111. The primary torque factor in Equation (1) is, for example, a value obtained by referring to a table storing the relationship between a speed ratio and a primary torque factor by using the speed ratio as a key. The "speed ratio" is a ratio of an output revolution speed (T/C output revolution speed) and an input revolution speed (T/C input revolution speed) of the torque converter 111 (more specifically (T/C output revolution speed)/(T/C input revolution speed)). The T/C output revolution speed is a value obtained by multiplying an output shaft revolution speed detected by the T/M output shaft revolution speed sensor 14 by a gear ratio of the present speed stage (speed stage designated from the controller 200 or a calculated speed stage). The T/C input revolution speed in Equation (1) is a clutch output shaft revolution speed detected by the clutch output shaft revolution speed sensor 13. Q1 in Equation (1) is a constant (for example, $10^{-6}$) for converting units.

T2 is a clutch torque capacity (kgm). The clutch pressure in Equation (2) is a clutch pressure (kg/cm$^2$) detected by the clutch pressure sensor 12. Q2 in Equation (2) is a value calculated by dividing a torque capacity (for example, 370 (kgm)) at a certain clutch pressure (for example, 25 (kg/cm$^2$)) by the clutch pressure.

According to Equation (3), T3 is a smaller value of the above-described T1 and T2.

According to Equation (4), the traveling side load torque T4 is calculated by dividing T3 by a gear ratio of the traveling system in the PTO 102.

<Calculation of Hydraulic Side Load Torque>

The "hydraulic side load torque" as referred to herein is a load torque applied to the engine 101 from a load device that belongs to the hydraulic device system 104. In the present embodiment, the load device that belongs to the hydraulic device system 104 is one pump from among a plurality of pumps, more specifically, the loader pump 120. Therefore, the hydraulic side load torque in the present embodiment is a load torque applied from the load pump 120 to the engine 101 (referred to hereinbelow as "loader pump load torque"). The loader pump load torque is also calculated by the load torque calculation program 1201. The loader pump load torque (kgm) is calculated, for example, by the procedure shown in FIG. 3 (in the explanation of "Calculation of Hydraulic Side Load Torque" below the term "pump" means "the loader pump").

Thus, first, a pump flow rate (L/min) is calculated. The pump flow rate is calculated, for example, by computations from Equation (5) below.

Pump Flow Rate=(Engine Flow Rate(rpm))×(Pump Capacity(cc/rev))×(Pump Swash Plate(%))   Equation (5).

The engine revolution speed in Equation (5) is an engine revolution speed detected by the engine revolution speed sensor 11. The pump capacity in Equation (5) is, for example, a preset value or a calculated value. The pump swash plate in Equation (5) is, for example, a value designated by a control signal from the controller 200 to obtain the amount of fluid necessary for the work according to the lever operation amount. In calculations conducted with Equation (5), a multiplier may be also used for conversion of units.

The pump horsepower (PS) is then calculated. The pump horsepower is calculated, for example, by Equation (6) below.

Pump Horsepower=(Pump Flow Rate(L/min))×(Pump Pressure(kg/cm$^2$))×Pump Capacity Efficiency (%))×(Pump Torque Efficiency(%))   Equation (6).

The pump flow rate in Equation (6) is calculated by computations from Equation (5). The pump pressure in Equation (6) is a loader pump hydraulic pressure detected with the loader pump hydraulic pressure sensor 15. The pump capacity efficiency and pump torque efficiency in Equation (6) are, for example, respective preset values. In calculations conducted with Equation (6), a multiplier may be also used for conversion of units.

Finally, the loader pump load torque is calculated. The loader pump load torque T5 is calculated, for example, by computations from Equation (7) below.

T5=(Pump Horsepower(PS)/(Engine Revolution Speed(rpm))   Equation (7).

The pump horsepower in Equation (7) is calculated by computations from Equation (6). The engine revolution speed in Equation (7) is an engine revolution speed used in Equation (5) (engine revolution speed detected by the engine revolution speed sensor 11). In calculations conducted with Equation (7), a multiplier (for example, ½π) may be also used for conversion of units (for example, radian conversion).

<Calculation of Total Torque>

The total torque (T6) is a load torque calculated by the load torque calculation program 1201 and represents a sum total of the traveling side load torque (T4) and the hydraulic side load torque (loader pump load torque) (T5).

<Selection of Maximum Output Characteristic>

The maximum output characteristic can be also called engine performance defined by the maximum output torques of the engine at various engine revolution speeds. In the present embodiment, for example, maximum output characteristics of two kinds, namely, a P-mode maximum output characteristic and an E-mode maximum output characteristic can be selected.

FIG. 4A is a diagram representing the P-mode maximum output characteristic and the E-mode maximum output characteristic.

The P-mode maximum output characteristic is shown by a solid line in FIG. 4A and determined by the maximum output torques of the engine at various engine revolution speeds that can be outputted in the P mode. The "P mode" as referred to herein is a power mode, namely, a control mode in which power has a priority over fuel consumption.

The E mode maximum output characteristic is shown by a combination of a solid line and a dot line in FIG. 4A and determined by the maximum output torques of the engine at various engine revolution speeds that can be outputted in the E mode. As follows from FIG. 4A, in the E-mode maximum output characteristic, the maximum output torque within a predetermined engine revolution speed range (for example, the range from R1 to R2 shown in FIG. 4) is lower than that in the P mode maximum output characteristic. Further, with the E-mode maximum output characteristic, the maximum engine revolution speed that can be outputted in the E mode is lower than the maximum engine revolution speed that can be outputted in the P mode. The "E mode" as a referred to herein is an economy mode in which fuel consumption takes priority over power.

In this example, the maximum output characteristics that can be selected include two characteristics, namely, the P-mode maximum output characteristic and the E mode maximum output characteristic, but there may be three or more such characteristics. Further, a plurality of maximum output characteristics may be also obtained by changing one maximum output characteristic in multiple stages or in a stepless manner. Further, the maximum output characteristic is not limited to the broken line such as shown by way of example in FIG. 4A, and the entire maximum output characteristic or part thereof may be a curve.

In the present embodiment, either of the P-mode and E-mode is selected by the control program 1203 on the basis of the calculated T4, T5, and T6, that is, the traveling system load torque, hydraulic system load torque (loader pump load torque), and total torque. The control program 1203 executes the control such that the maximum output characteristic of the engine 101 matches the maximum output characteristic corresponding to the selected control mode. More specifically, for example, the control program 1203 controls the fuel injection amount so that the engine output torque at the engine revolution speed detected by the sensor 11 does not exceed the maximum output torque at the engine revolution speed at the selected maximum output performance.

Therefore, selecting a control mode means selecting one maximum output characteristic from among a plurality of maximum output characteristics that can be selected. More specifically, selecting the P mode means selecting the P-mode maximum output characteristic, and selecting the E mode means selecting the E-mode maximum output characteristic.

When to select the P-mode maximum output characteristic and when to select the E-mode maximum output characteristic will be explained below in greater detail.

In the present embodiment, at least one load torque threshold, for example, two load torque thresholds are provided for each calculated load torque (T4, T5, and T6).

FIG. 4B shows the relationship between T4 and the control mode range.

A first T4 threshold ($Th_{41}$) and a second T4 threshold ($Th_{42}$) that is greater than the first T4 threshold are provided. Both the $Th_{41}$ and the $Th_{42}$ are constants that do not depend on the engine revolution speed.

According to FIG. 4B, a range in which the engine output torque is from 0 to less than $Th_{41}$ is an E-mode range, a range from a value equal to or greater than $Th_{41}$ to a value equal to or less than $Th_{42}$ is an insensitivity zone, and a range greater than $Th_{42}$ is a P-mode range. T4 belongs to the P-mode range when it exceeds $Th_{42}$, to the E-mode range when it is less than $Th_{41}$, and to the insensitivity zone in other cases. For example, a state in which T4 belongs to the P-mode range is maintained when it is equal to or greater than $Th_{41}$ even when it decreases from a value higher than $Th_{42}$ to a value less than $Th_{42}$. Where it further decreases to a value less than $Th_{41}$, a transition is made from a state belonging to the P-mode range to a state belonging to the E-mode range. Conversely, a state in which T4 belongs to the E-mode range is maintained when it is equal to or less than $Th_{42}$ even when it increases from a value less than $Th_{41}$ to a value greater than $Th_{41}$, but when it further increases to a value higher than $Th_{42}$, a transition is made from a state belonging to the E-mode range to a state belonging to the P-mode range. When T4 is in a state belonging to the P-mode range, for example, the control program 1203 writes (for example, into a register in the storage unit 220 or computational unit 210) information representing such a state (for example, a flag; referred to hereinbelow as "P-mode flag"). When T4 is in a state belonging to the E-mode range, for example, information representing such a state (for example, a flag; referred to hereinbelow as "E-mode flag") is written.

The description relating to T4 above also relates to T5 and T6. Thus, at least one load torque threshold, for example, two load torque thresholds such as shown in FIG. 5A or FIG. 5B are provided for T5 and T6. Two load torque thresholds $Th_{51}$ and $Th_{52}$ relating to T5 and two load torque thresholds $Th_{61}$ and $Th_{62}$ relating to T6 are constant regardless of the engine revolution speed.

FIG. 5A shows the relationship between a control mode range and T5 calculated for a certain engine revolution speed, and FIG. 5B shows the relationship between a control mode range and T6 calculated for a certain engine revolution speed (in the present embodiment, T5 and T6 have corresponding same values at any engine revolution speed, and the relationships shown in the figures are therefore valid at any engine revolution speed).

According to FIG. 5A, at a certain engine revolution speed, T5 maintains a state belonging to the P-mode range even when it decreases from a value exceeding the second T5 threshold ($Th_{52}$) to a value less than $Th_{52}$, provided that it is equal to or greater than the first T5 threshold ($Th_{51}$) which is lower than $Th_{52}$, but when it further decreases to a value less than $Th_{51}$, a transition is made from a state belonging to the P-mode range to a state belonging to the E-mode range (for example, the P-mode flag is canceled and the E-mode flag is written). Conversely, T5 maintains a state belonging to the E-mode range even when it increases from a value less than $Th_{51}$ to a value greater than $Th_{51}$, provided that it is equal to or less than $Th_{52}$, but when it further increases to a value greater than $Th_{52}$, a transition is made from a state belonging to the E-mode range to a state belonging to the P-mode range (for example, the E-mode flag is canceled and the P-mode flag is written).

Likewise, according to FIG. 5B, at a certain engine revolution speed, T6 maintains a state belonging to the P-mode range even when it decreases from a value exceeding the second T6 threshold ($Th_{62}$) to a value less than $Th_{62}$, provided that it is equal to or greater than the first T6 threshold ($Th_{61}$) which is lower than $Th_{62}$, but when it further decreases to a value less than $Th_{61}$, a transition is made from a state belonging to the P-mode range to a state belonging to the E-mode range (for example, the P-mode flag is canceled and the E-mode flag is written). Conversely, T6 maintains a state belonging to the E-mode range even when it increases from a value less than $Th_{61}$ to a value greater than $Th_{61}$, provided that it is equal to or less than $Th_{62}$, but when it further increases to a value greater than $Th_{62}$, a transition is made from a state belonging to the E-mode range to a state belonging to the P-mode range (for example, the E-mode flag is canceled and the P-mode flag is written).

Figure 6A:
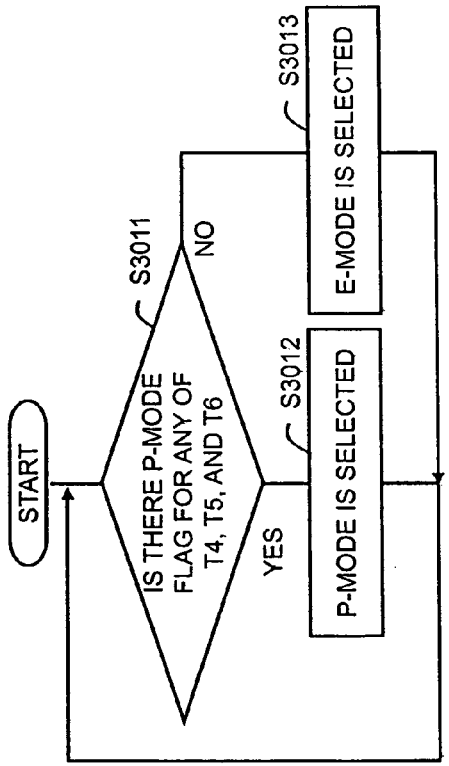
FIG. 6A shows a flow of control mode selection.

FIG. 6A is a flow of control mode selection.

When a P-mode flag is written in any of T4, T5, and T6 (YES in step S3011), the control program 1203 selects the P mode (in other words, a P-mode maximum output characteristic is selected) (S3012). Where a P-mode flag is not written in any of the T4, T5, and T6, (in other words, when an E-mode flag is written with respect to all of the T4, T5, and T6) (NO in step S3011), the control program 1203 selects the E mode (in other words, an E-mode maximum output characteristic is selected) (S3013).

The first embodiment is described above.

According to the present embodiment, the traveling side load torque, hydraulic side load torque (loader pump load torque), and total torque are calculated and the P-mode range and E-mode range are used with respect to each calculated load torque. Further, when any one of the traveling side load torque, hydraulic side load torque, and total torque is in a state belonging to the P-mode range, a P-mode maximum output characteristic is selected.

A load torque other than the traveling side load torque and hydraulic side load torque (loader pump load torque) is applied to the engine 101. For example, in the present embodiment, a load torque from a loader pump which is one from among a plurality of pumps is calculated as the hydraulic side load torque, but a load is also applied to the engine 101 from other pumps. Further, load devices other than pumps also apply a load to the engine 101. Therefore, it can be assumed that a load torque higher than the sum total (in other words, the total torque) of the traveling side load torque and hydraulic side load torque (loader pump load torque) is applied to the engine 101. For this reason, it is desirable that the maximum output torque of the engine at the present engine revolution speed (detected engine revolution speed) be equal to or greater than a load torque that is higher than the total torque.

Accordingly, in the present embodiment, as described hereinabove, when any one of the traveling side load torque, hydraulic side load torque, and total torque is in a state belonging to the P-mode range, a P-mode maximum output characteristic is selected. Therefore, the reliability attaining the maximum output torque for the torque equal to or greater than the load torque actually applied to the engine 101 can be expected to increase. In other words, it can be expected that the maximum distributed torque that can be outputted from the engine 101 and distributed to the traveling system 103 and loader pump 120 at the present engine revolution speed will be equal to or higher than the calculated traveling side load torque or loader pump load torque.

The following several variation examples can be considered in the first embodiment.

Figure 6B:
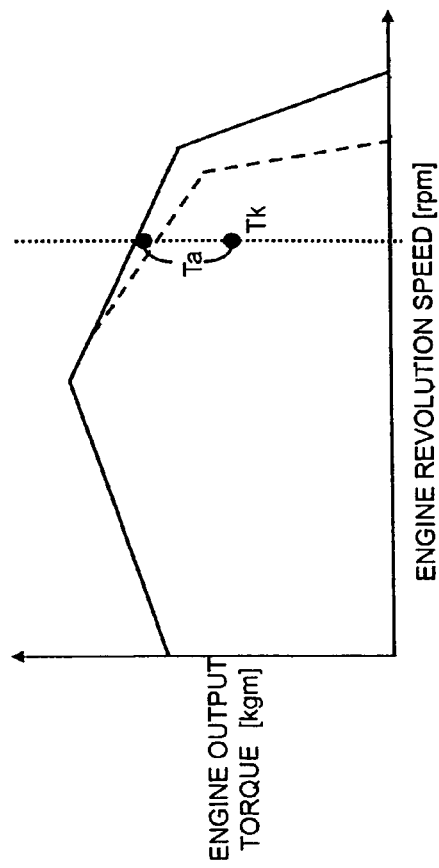
FIG. 6B is an explanatory drawing illustrating mode selection in the first variation example of the first embodiment of the present invention.

In the first variation example, as shown in FIG. 6B, a P-mode maximum output characteristic is selected such that a torque equal to or greater than a sum total of a specific load torque Tk and a predetermined additional torque Ta becomes the maximum output torque at the present engine revolution speed. According to FIG. 6B, an E-mode output characteristic may be selected where a torque equal to or greater than the specific load torque Tk is wished to be made the maximum output torque, but as described hereinabove, a load torque other than the specific load torque Tk is also present in the engine 101 and therefore the P-mode maximum output characteristic is selected such that a torque equal to or greater than a value obtained by adding the predetermined additional torque Ta to the specific load torque Tk becomes the maximum output torque. For this reason, the additional torque Ta is adjusted on the basis of the present engine revolution speed (detected engine revolution speed) and the specific load torque Tk to a value such that a torque equal to or greater than a load torque that is actually applied to the engine 101 becomes the maximum output torque. The additional torque Ta may be a function of the engine revolution speed (in other words, may have a value that changes depending on the engine revolution speed). Further, the specific load torque Tk is, for example, one or a sum total of two or more of a plurality of load torques.

In the second variation example, one or a plurality of load torque thresholds relating to at least one from among T4, T5, and T6 may be a function of engine revolution speed. FIG. 7A shows an example in which two load torque thresholds $Th_{41}$ and $Th_{42}$ relating to T4 are functions of engine revolution speed. The entire line representing the load torque threshold is not necessarily a curve, as shown in FIG. 7A, and may be partially or entirely a straight line.

In the third variation example, an E-mode maximum output characteristic may be selected with respect to a predetermined number of load torques that is less than half of the plurality of load torques (according to the aforementioned example, one load torque from among T4, T5, and T6), as a fuel consumption preference, if this predetermined number of load torques is in a state belonging to the E-mode range.

In the fourth variation example, load torques from one or a plurality of other pumps (for example, the switch pump 121) are calculated instead of or in addition to the load torques of the loader pump 120. The hydraulic side load torque will be calculated by way of example in the below-described manner with respect to a case in which a plurality of pumps that include or do not include the loader pump 120 are considered. Thus, a pump flow rate is calculated for each pump, and a pump horsepower is calculated on the basis of the calculated pump flow rate. Further, a total pump horsepower is calculated by adding up a plurality of pump horsepower values corresponding to a plurality of pumps, and a hydraulic side load torque (T5) is calculated by dividing the calculated total pump horsepower by the present engine revolution speed.

In the fifth variation example, the kinds of load torques that are taken into account in determining whether to select a P-mode maximum output characteristic or an E-mode maximum output characteristic are not limited to the above-described three kinds and the number of kinds may be less or more than three. More specifically, for example, only T4, only T5, only T6, or only two thereof may be considered.

Embodiment 2

The second embodiment of the present invention will be described below. In this case, mainly the difference between the second embodiment and the first embodiment will be described, and the explanation of common features of the two embodiments will be omitted or simplified (the same relates to the explanation of the third embodiment below).

In the second embodiment, a maximum output characteristic is selected on the basis of the detected engine revolution speed, instead of the calculated load torque.

FIG. 7B shows the relationship between an engine revolution speed and a control mode range.

As shown in FIG. 7B, at least one revolution speed threshold, for example two revolution speed thresholds $Rh_1$ and $Rh_2$ are provided. In the present embodiment, revolution speed thresholds $Rh_1$ and $Rh_2$ are both constant regardless of the load torque applied to the engine 101 (referred to hereinbelow as "engine load torque").

Figure 8A:
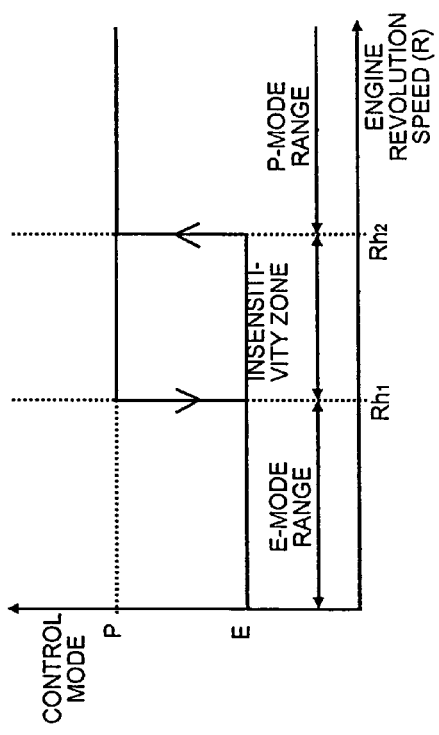
FIG. 8A shows the relationship between an engine revolution speed and a control mode range in the case of a certain load torque.

FIG. 8A shows the relationship between an engine revolution speed in the case of a certain engine load torque and a control mode range (in the present embodiment, as described above, $Rh_1$ and $Rh_2$ have the same value regardless of the load torque applied to the engine, and the relationship shown in the figure is valid at any engine load torque).

According to FIG. 7B and FIG. 8A, the engine revolution speed maintains a state belonging to the P-mode range even when it decreases from a value exceeding $Rh_2$ to a value less than $Rh_2$, provided that it is equal to or greater than $Rh_1$, but when it further decreases to a value less than $Rh_1$, a transition is made from a state belonging to the P-mode range to a state belonging to the E-mode range (for example, the P-mode flag is canceled and the E-mode flag is written). Conversely, the engine revolution speed maintains a state belonging to the E-mode range even when it increases from a value less than $Rh_1$ to a value greater than $Rh_1$, provided that it is equal to or less than $Rh_2$, but when it further increases to a value greater than $Rh_2$, a transition is made from a state belonging to the E-mode range to a state belonging to the P-mode range (for example, the E-mode flag is canceled and the P-mode flag is written).

In the present embodiment, the control program 1203 selects the P mode (selects a P-mode maximum output characteristic) when the engine revolution speed belongs to a P-mode range, and selects the E mode (selects an E-mode maximum output characteristic) when the engine revolution speed belongs to an E-mode range.

The second embodiment is explained above.

This embodiment is apparently effective in applications (for example, a passenger vehicle) in which it is important to ensure a high traveling speed even if the requested torque is low. By contrast, the above-described first embodiment is effective in applications in which the requested torque is high even if the engine revolution speed is low.

The following several variation examples can be considered in the second embodiment.

Figure 8B:
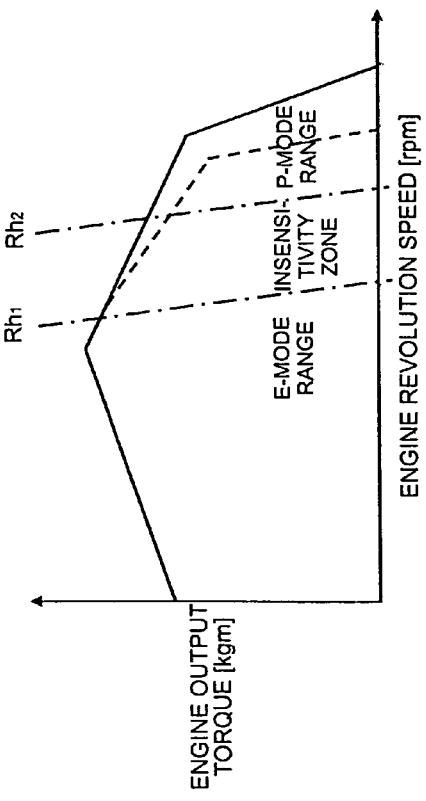
FIG. 8B is an explanatory drawing illustrating an engine revolution speed threshold in the first variation example of the second embodiment of the present invention.

In the first variation example, one or a plurality of revolution speed thresholds (for example, the above-described $Rh_1$ and $Rh_2$) are functions of the engine load torque, as shown by way of example in FIG. 8B.

Figure 9A:
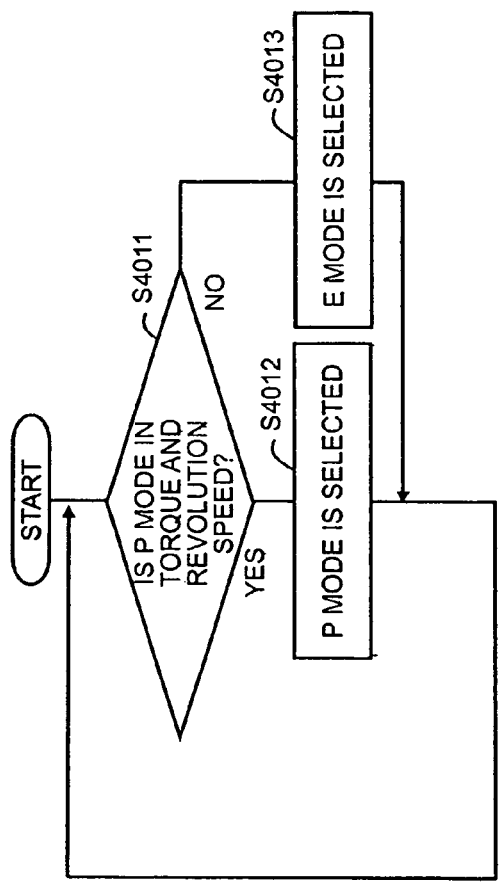
FIG. 9A is an explanatory drawing of control mode selection in the second variation example of the second embodiment of the present invention.

The second variation example is a combination of the second embodiment and the above-described first embodiment. More specifically, for example, as shown in FIG. 9A, the control program 1203 selects the P mode (S4012) where the P mode is to be selected for both the load torque and the engine revolution speed (YES in S4011), and selects the E mode if the E mode is to be selected for at least one of the load torque and the engine revolution speed (NO in S4011). This is apparently effective, for example, in applications in which the P mode is undesirable (for example, in applications when fuel consumption efficiency has preference over the work performance).

Instead of such selection, the control program 1203 may select the P mode for the load torque and the control program 1203 may select the P mode where the P mode is to be selected for either of the load torque and the engine revolution speed and select the E mode where the E mode is to be selected for both the load torque and the engine revolution speed.

Embodiment 3

Figure 9B:
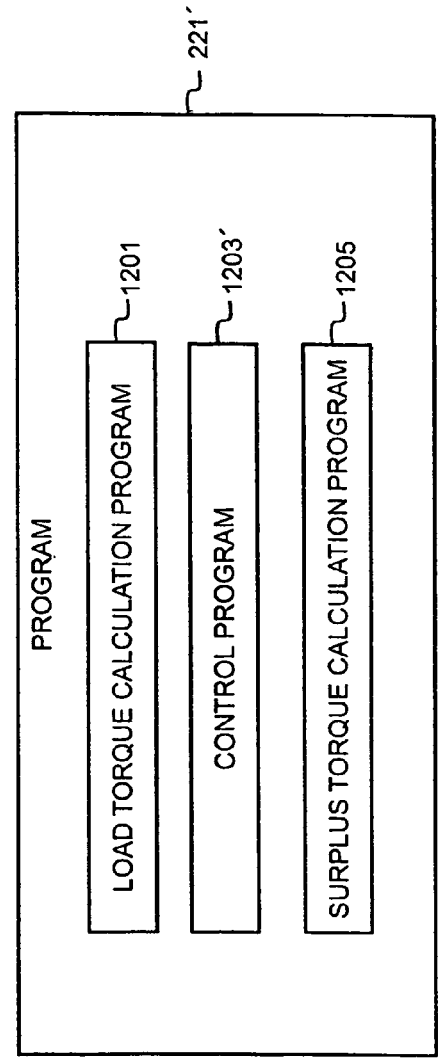
FIG. 9B shows a configuration example of program in the third embodiment of the present invention.

FIG. 9B is a configuration example of a program 221' in the third embodiment.

A control program 1203' of conducting control mode selection on the basis of the below-described surplus torque is included instead of or in addition to the above-described control program 1203 in the program 221'. Further, a surplus torque calculation program 1205 is further included in the program 221'. The surplus torque calculation program 1205 serves to calculate the below-described surplus torque.

The processing performed in the third embodiment will be explained below.

An output limit that is shown by a two-dot-dash line in FIG. 10A and follows the accelerator opening degree varies depending on the accelerator opening degree, as shown by a dot-dash arrow in FIG. 10A. The terminal "output limit" as used herein indicates which torque can be outputted at maximum at which engine revolution speed. The accelerator opening degree command is not limited to that based on the accelerator pedal 2001, and the command may be provided by a dial or a button (not shown in the figure).

The control program 1203' determines the present maximum output characteristic on the basis of the selected maximum output characteristic and the output limit that follows the present accelerator opening degree. More specifically, for example, when the selected maximum output characteristic is an E-mode output characteristic, as shown in FIG. 10B, the maximum output characteristic that uses the smaller of the maximum output torques at each engine revolution speed, from among the E-mode maximum output characteristic and the output limit that follows the present accelerator opening degree, becomes the present maximum output characteristic. Therefore, according to FIG. 10B, a thick solid line is the present maximum output characteristic. For example, when the machine operates at a certain engine revolution speed in the E-mode maximum output characteristic, when the accelerator opening degree is changed, the maximum output characteristic is changed to a characteristic corresponding to the accelerator opening degree.

Figure 11A:
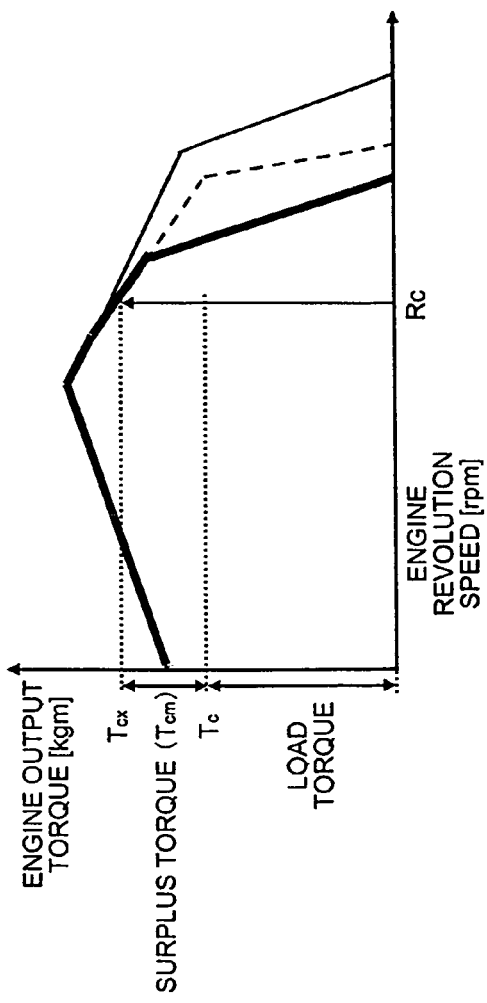
FIG. 11A is an explanatory drawing of surplus torque calculations.

As shown in FIG. 11A, the surplus torque calculation program 1205 finds the present maximum output torque (Tcx) at the present engine revolution speed (detected engine revolution speed) Rc from the present maximum output characteristic. Then, the surplus torque calculation program 1205 calculates the difference between Tcx and the present load torque (Tc). This difference is the surplus torque (Tcm). In this connection, the aforementioned Tc is, for example, any one from the above-described T4, T5, and T6. Where a plurality of Tc are present (for example, when the load torques of at least two kinds from among the above-described T4, T5, and T6 are each Tc), there is also a plurality of Tcm that will be calculated.

Figure 11B:
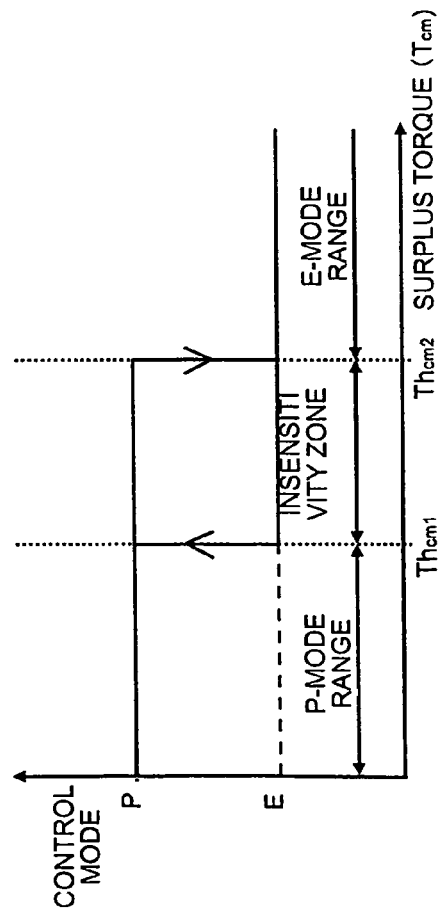
FIG. 11B shows the relationship between a surplus torque and a control mode range.

The control program 1203' selects a control mode on the basis of the calculated Tcm. For example, the control program 1203' selects the P mode where Tcm is less than a first Tcm threshold ($Th_{cm1}$) and selects the E mode where Tcm exceeds a second Tcm threshold ($Th_{cm2}$), which is larger than $Th_{cm1}$. More specifically, for example, as shown in FIG. 11B, Tcm maintains a state belonging to the E-mode range even when it decreases from a value exceeding $Th_{cm2}$ to a value less than $Th_{cm2}$, provided that it is equal to or greater than $Th_{cm1}$, but when it further decreases to a value less than $Th_{cm1}$, a transition is made from the state belonging to the E-mode range to a state belonging to the P-mode range (for example, the E-mode flag is canceled and the P-mode flag is written). Conversely, Tcm maintains a state belonging to the P-mode range even when it increases from a value less than $Th_{cm1}$ to a value greater than $Th_{cm1}$, provided that it is equal to or less than $Th_{cm2}$, but when it further increases to a value greater than $Th_{cm2}$, a transition is made from a state belonging to the P-mode range to a state belonging to the E-mode range (for example, the P-mode flag is canceled and the E-mode flag is written).

The third embodiment is explained above. When a plurality of Tcm is calculated, the processing such as explained with reference to FIG. 11B is executed with respect to each Tcm. As a result, the P-mode may be selected if the P-mode flag is present for less than half (for example, one) of the plurality of Tcm, or the E-mode may be selected if the E-mode flag is present for less than half (for example, one) of the plurality of Tcm. Further, at least one surplus torque threshold may be a function of the engine revolution speed and/or accelerator opening degree.

Several embodiments of the present invention are described above. However, these embodiment merely serve to illustrate the present invention, and the scope of the invention is not limited to these embodiments. The present invention can be implemented in a variety of other modes, without departing from the essence thereof.

For example, in at least one of the first to third embodiments, the load torque threshold may be a function of the accelerator opening degree instead of or in addition to the engine revolution speed. Further, in the second embodiment, the revolution speed threshold may be a function of the accelerator opening degree instead of or in addition to the load torque.

Further, for example, which of the P mode and E mode to select is determined base on the relationship between the load torque, engine revolution speed, or surplus torque and the threshold, but the selection may be also made base on conformity to other conditions.

Further, for example, two or more embodiments and/or variation examples from among the plurality of the above-described embodiments and variation examples may be combined.

For example, a certain embodiment, a certain variation example, or a combination of two or more embodiments and/or variation examples may be selected manually by the operator or automatically on the basis of work conditions or the like, and the selected embodiment, variation example, or combination may be executed. More specifically, for example, modes of a plurality of kinds, such as a work preference mode, a speed preference mode, and a fuel consumption efficiency preference mode may be prepared for selection, and when the work preference mode is selected, for example, the processing explained with reference to FIG. 4B to FIG. 6A is executed, when the speed preference mode is selected, the processing explained with reference to FIG. 7B and FIG. 8A is executed, and when the work preference mode is selected, the processing explained with reference to FIG. 9A may be executed.

The invention claimed is:

1. An engine-driven working machine, comprising:
at least two load devices including a traveling-system load device associated with a traveling system of the working machine, and a hydraulic-system load device associated with a hydraulic device system of the working machine;
an engine supplying a load torque at a present engine revolution speed for driving the traveling-system and hydraulic device load devices;
a load torque calculation unit that calculates the load torque applied to the engine from at least one of the traveling-system load device and the hydraulic-system load device; and
a control unit that performs variable control within the working machine and controls the load torque output by the engine at the present engine revolution speed to a maximum output torque that is equal to or greater than the calculated load torque.

2. The engine-driven working machine according to claim 1, wherein the control unit has a first mode and a second mode, in the first mode, the control unit matches the maximum output torque of the engine with a first maximum output torque, and in the second mode the, control unit matches the maximum output torque of the engine with a second maximum output torque, and when the calculated load torque conforms to a first load torque condition, the control unit matches the maximum output torque of the engine with the first maximum output torque, and when the calculated load torque conforms to a second load torque condition, the control unit matches the maximum output torque of the engine with the second maximum output torque, and wherein at a predetermined engine revolution speed range, the first maximum output torque is lower than the second maximum output torque.

3. The engine-driven working machine according to claim 2, wherein the first load torque condition is the calculated load torque being equal to or less than a first load torque threshold, the second load torque condition is the calculated load torque being equal to or greater than a second load torque threshold, and the first load torque threshold is lower than the second load torque threshold.

4. The engine-driven working machine according to claim 3, wherein at least one of the first load torque threshold and the second load torque threshold is constant regardless of at least one of an engine revolution speed and an accelerator pedal angle.

5. The engine-driven working machine according to claim 3, wherein at least one of the first load torque threshold and the second load torque threshold is a function of at least one of an engine revolution speed and an accelerator opening degree.

6. The engine-driven working machine according to claim 2, wherein the load torque calculation unit calculates the load torque applied to the engine from at least one of:
  a first load torque of the traveling system load device,
  a second load torque of the hydraulic-system load device, and
  a third load torque of both the traveling-system load device and the hydraulic-system load device.

7. The engine-driven working machine according to claim 6, wherein the first load torque condition and the second load torque condition are respectively set for the first torque load and the second torque load.

8. The engine-driven working machine according to claim 6, wherein the load torque calculation unit calculates the load torque applied to the engine from at least two of the first, second, and third load torques, and when combined load torques of a predetermined number of the plurality of load devices are less than half the load torque applied to the engine from the at least two of the first, second and third load torques and both load torques conform to the second condition, the control unit matches the maximum output torque of the engine with the second maximum output torque.

9. The engine-driven working machine according to claim 6, wherein the load torque calculation unit calculates the load torque applied to the engine from at least two of the first, second, and third load torques, and when combined load torques of a predetermined number of the plurality of load devices are less than half the calculated load torque from the at least two of the first, second and third load torques and both load torques conform to the second condition, the control unit matches the maximum output torque of the engine with the first maximum output torque.

10. The engine-driven working machine according to claim 2, wherein the control unit matches the maximum output torque of the engine with at least one:

the first maximum output torque when a present engine revolution speed conforms to a first revolution speed condition even if the calculated load torque does not conform to the first load torque condition, and the second maximum output torque when the present engine revolution speed conforms to a second revolution speed condition even if the calculated load torque does not conform to the second load torque condition.

11. The engine-driven working machine according to claim 10, wherein the first revolution speed condition corresponds to the present revolution speed being equal to or lower than a first revolution speed threshold, the second revolution speed condition corresponds to the present revolution speed being equal to or greater than a second revolution speed threshold, and the first revolution speed threshold is lower than the second revolution speed threshold.

12. The engine-driven working machine according to claim 11, wherein at least one of the first revolution speed threshold and the second revolution speed threshold is constant regardless of the load torque applied to the engine.

13. The engine-driven working machine according to claim 11, wherein at least one of the first revolution speed threshold and the second revolution speed threshold is a function of the load torque applied to the engine.

14. The engine-driven working machine according to claim 1, further comprising a surplus torque calculation unit that calculates a surplus torque that is a difference between the calculated load torque and the maximum output torque at the present engine revolution speed, wherein the control unit performs variable control of the maximum output torque of the engine in accordance with the calculated surplus torque.

15. The engine-driven working machine according to claim 14, wherein the control unit has a first mode and a second mode, in the first mode, the control unit matches the maximum output torque of the engine with a first maximum output torque, and in the second mode, the control unit matches the maximum output torque of the engine with a second maximum output torque, and when the calculated surplus torque conforms to a first surplus torque condition, the control unit matches the maximum output torque of the engine with the first maximum output torque, and when the calculated surplus torque conforms to a second surplus torque condition, the control unit matches the maximum output torque of the engine with the second maximum output torque, and wherein the maximum output torque in a predetermined engine revolution speed range in the first maximum output torque is lower than that in the second maximum output torque.

16. The engine-driven working machine according to claim 15, wherein
the first surplus torque condition is the calculated surplus torque being equal to or greater than a first surplus torque threshold,
the second surplus torque condition is a condition of the calculated surplus torque being equal to or less than a second surplus torque threshold, and
the first surplus torque threshold is higher than the second surplus torque threshold.

17. The engine-driven working machine according to claim 14, wherein the surplus torque is a difference between the maximum output torque at the present engine revolution speed and at a present accelerator opening degree, and the calculated load torque.

18. The engine-driven working machine according to claim 1, wherein the control unit performs variable control of the maximum output torque of the engine such that a maximum distributed torque that is outputted from the engine at the present engine revolution speed and that can be distributed to the at least one of the traveling-system load device and the hydraulic-system load device is equal to or greater than the calculated load torque.

19. The engine-driven working machine according to claim 1, wherein the calculated load torque is a sum total of the calculated load torque and a torque of a predetermined size.

20. An engine-driven working machine, comprising:
a plurality of load devices including a traveling load device associated with a traveling system of the working machine and a hydraulic load device associated with a hydraulic device system of the working machine;
an engine driving the plurality of loading devices by outputting a load torque at a present engine revolution speed;
a load torque calculation unit that calculates the load torque applied to the engine from at least one of the traveling load device and the hydraulic load device; and
a control unit that performs variable control of the working machine that controls the load torque output by the engine to a maximum output torque that is equal to or greater than the calculated load torque.

\* \* \* \* \*